Patented Apr. 5, 1932

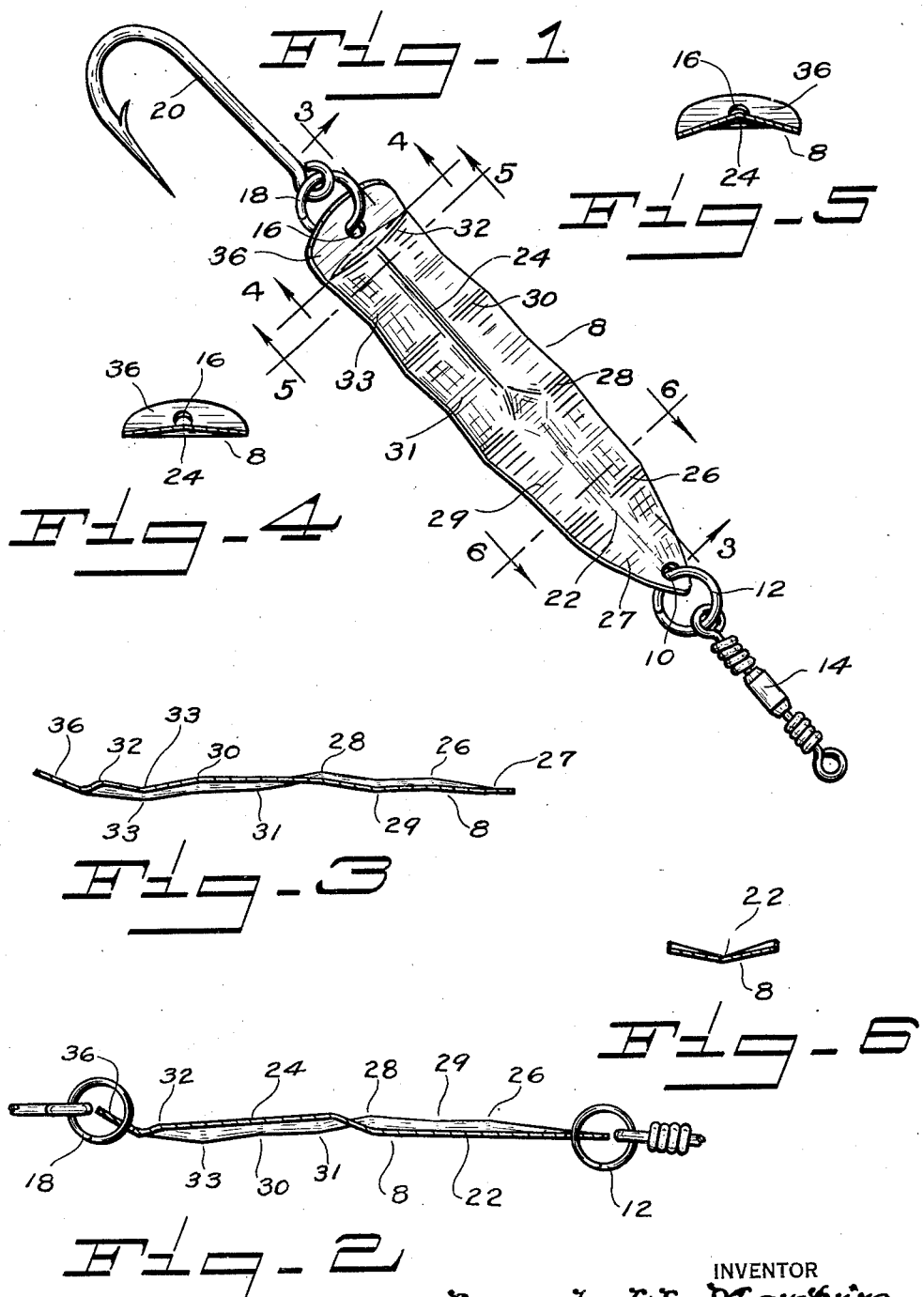

1,852,620

UNITED STATES PATENT OFFICE

JOSEPH H. MARTIN, OF SEATTLE, WASHINGTON

TROLLING LURE

Application filed May 29, 1930. Serial No. 456,969.

My present invention relates to the fishing art and more particularly to a trolling lure.

My trolling lure or spoon is of that general class commonly referred to as single piece non-revolving type. This art is well expressed in such patents as 1,136,475 or 1,422,475. Both of these lures have been very satisfactory and are characterized by wobbling rather than spinning, the wobbling action being prompted by protuberances located near the front end of the spoon and which is accentuated by the water impinging upon a bent-up rear portion. In my spoon I retain the rear bent-up lip but have constructed the balance of my spoon quite differently as I do not want to produce the wobbling action of the referred to spoons. The construction I have adopted gives my spoon a darting action rather than the wobbling action, and as this creates the illusion of a minnow attempting to escape, a large fish pursuing it, the lure has proven very satisfactory and effective. Therefore:

The principal object of my invention is to provide a trolling lure which creates the illusion of a darting fish.

A further object is to provide a fishing lure which, because of its unusual construction, provides a large number of light-reflecting surfaces.

A still further object is to provide a fishing lure which because of its structural shape provides unusual strength, even when made from light-weight material.

A still further object is to provide a fishing spoon which will normally ride in a vertical plane as it passes through the water.

Other and more specific objects will be apparent from the following description taken in connection with the accompanying drawings, wherein:

Figure 1 is a prospective view of my lure, showing my new design.

Figure 2 is a sectional view taken along the longitudinal axis of my spoon.

Figure 3 is a sectional view taken along the line 3—3 of Figure 1.

Figure 4 is a cross sectional view taken along the line 4—4 of Figure 1.

Figure 5 is a cross sectional view taken along the line 5—5 of Figure 1.

Figure 6 is a cross sectional view taken along the line 6—6 of Figure 1.

Referring to the drawings throughout which like reference numerals indicate like parts, 8 designates the body of my lure, which is constructed preferably of a strip of thin metal, which is normally formed into the shape indicated by the use of dies. A forward opening 10 is provided for the attachment, as by ring 12, of a swivel 14, to which in turn is connected the towing line. At the rear end of the spoon another opening 16 is provided to which is attached, as by ring 18, any desired type of fish hook as 20.

It is my desire to provide a spoon which will normally repose in a vertical plane as it is drawn through the water in use. To accomplish this, the best form would be a perfectly straight piece of material. However, a perfectly straight piece of material would not create the lifelike illusion, which is so essential in a lure of this kind, and with this end in view I have formed the body 8 of my lure as having two longitudinally disposed gullies, the one at the forward end being depressed downwardly as indicated at 22 and at the rear end a similar gully, which is struck from the opposite side so that it projects upwardly as viewed in Figure 1. This I have represented at 24. The purpose of the two gullies thus formed, instead of one long gully, is that I wish to counteract any wobbling tendency that might be created by the forward gully. As arranged the two gullies, being in the same axial line, counteract each other and enable me to retain the same general effect as though the spoon were a single straight piece of metal. The gullies have a still further function in that they add structural strength to the spoon.

It must be remembered in this connection, that spoons of this character are used in combating the large fish, principally salmon, which quite often are taken in weights up to 50 lbs. In fact some have been taken weighing over 100 lbs. Under such trying conditions, as this type of fishing provide, it is essential that the lure have sufficient structural strength so that it will not be easily deformed.

Disposed at right angles to the longitudinal gullies is a plurality of gullies, 26, 28, 30, 32, and ridges, 27, 29, 31, 33. The exact number is relatively unimportant. It must be borne in mind, however, that the more of these transverse gullies present in the spoon surface the more light-reflecting surfaces will be provided, and I have found that these light-reflecting surfaces create the illusion of sunlight on the side of a small fish, which normally, because of its scales and spots of varying color, give off much the same general light-reflecting. The transverse gullies by the very nature of their formation will be equal in number, that is, those which are valleys and those which are ridges when viewed from one side. This fact further carries out the balancing effect so that no real motion is given to the spoon as the result of these ridges and valleys, and the tendency is for the spoon to go straight through the water.

In order to insure my lure riding on edge, I find it necessary to provide sufficient weight at the rear end of the lure so it will drop slightly below the line of draft. I find I can attain the desired result by properly balancing, by trial, the size of lip 36 and the hook 20 against the spinning effect of the water impinging on the lip 36.

I have found it very essential, however, to provide a turned-up lip at the rear end of my spoon. This, as the spoon is drawn through the water, provides a surface which is angularly disposed with respect to the general plane of body 8, and upon which the water impinges. This action is, therefore, like that of a rudder and will cause the lure to be guided slowly to one side of its line of draft, much as a rudder will steer a ship. After this sideward movement has progressed for some distance, however, the drag of the line will come from an angle with reference to the axis of the spoon and a point will be reached where the drag of the line will change the direction of the spoon even against the impinging surface 36. In this case the principal surface of the spoon will act much like the surface of a kite and a very rapid side movement will result. This action, when the speed of draft is proper, can be made to very closely approximate the action of the small fish, which form the principal food of the game fish, as they dart out of the way of the larger fish.

The foregoing description and the accompanying drawings clearly disclose a preferred embodiment of my invention but it will be understood that this disclosure is merely illustrative and that such changes in the invention may be made as are fairly within the scope and spirit of the following claims.

What I claim is:

1. A trolling lure having a longitudinal gully at its forward end; a longitudinal ridge at its rear end; a plurality of transverse ridges and gullies disposed at right angles to the said longitudinal gully and ridge.

2. A trolling lure having a longitudinal gully at its forward end; a longitudinal ridge at its rear end; a plurality of transverse gullies and ridges depressed at right angles to the said longitudinal gully and said longitudinal ridge and an upstanding lip at the extreme rear end of said lure.

3. A trolling lure comprising an elongated body having on its longitudinal axis a gully at its forward end and a ridge at its rear end; a plurality of alternately disposed ridges and gullies extending transversely of said body from the longitudinal axis to the edges and disposed at right angles to said longitudinal axis and an upstanding lip at the extreme rear end of said lure.

4. A trolling lure comprising an elongated body having on its longitudinal axis a gully at its forward end and a ridge at its rear end; said gully and ridge being of substantially equal length; a plurality of alternately disposed ridges and gullies extending transversely of said body from the edge of said body to the center of the body where they merge into either the longitudinal ridge or gully and an upstanding lip at the extreme rear end of said lure.

5. A fishing lure comprising an elongated body having on its longitudinal axis a gully at its forward end and a ridge at its rear end; said gully and ridge of approximately the same size so as to neutralize any wobbling tendency created by either; an equal number of transverse ridges and gullies disposed at right angles to the horizontal axis of the lure so proportioned as to neutralize any wobbling tendency created by themselves and the rear end of said body bent upwardly to provide a lip for the water to impinge against and give the lure its characteristic motion.

6. A trolling lure having a V-shaped ridge extending along its major axis rearwardly of its minor axis; a V-shaped gully extending along its major axis forwardly of its minor axis; said ridge and said gully forming reaction surfaces of equal extent; a plurality of alternately positioned ridges and gullies, transversely disposed, forming light reflecting surfaces which provide reaction of equal amount when the lure is drawn through the water and a motion controlling lip, upwardly extending, at the rear end of said longitudinal ridge.

In witness whereof, I hereunto subscribe my name this 21st day of May A. D. 1930.

JOSEPH H. MARTIN.